US007309238B2

(12) United States Patent
Yang

(10) Patent No.: US 7,309,238 B2
(45) Date of Patent: Dec. 18, 2007

(54) SHIELDED ELECTRICAL CONNECTOR WITH IMPROVED INSULATIVE HOUSING

(75) Inventor: Meng-Huan Yang, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/283,270

(22) Filed: Nov. 18, 2005

(65) Prior Publication Data

US 2006/0105631 A1     May 18, 2006

Related U.S. Application Data

(63) Continuation-in-part of application No. 11/148,503, filed on Jun. 8, 2005, now Pat. No. 7,147,481.

(30) Foreign Application Priority Data

Nov. 18, 2004    (CN) .................. 2004 2 0109013 U

(51) Int. Cl.
*H01R 12/00*    (2006.01)
(52) U.S. Cl. ....................... 439/71; 439/607
(58) Field of Classification Search ............. 439/71, 439/607
See application file for complete search history.

(56) References Cited

U.S. PATENT DOCUMENTS

| | | | | |
|---|---|---|---|---|
| 3,951,494 A | * | 4/1976 | Romine | 439/81 |
| 6,398,598 B2 | * | 6/2002 | Masumoto | 439/862 |
| 7,147,481 B2 | * | 12/2006 | Yang | 439/71 |
| 2002/0111064 A1 | * | 8/2002 | Kohno | 439/547 |
| 2003/0218873 A1 | * | 11/2003 | Eromaki et al. | 361/816 |
| 2004/0023528 A1 | | 2/2004 | Nishio et al. | |
| 2005/0215117 A1 | * | 9/2005 | Asai et al. | 439/607 |

* cited by examiner

*Primary Examiner*—Neil Abrams
(74) *Attorney, Agent, or Firm*—Wei Te Chung

(57) ABSTRACT

An shielded electrical connector (100), to which an electrical element (5) is electrically connected, includes an insulative housing (1) defining a number of passageways (101), a number of terminals (2) retained in the passageways, a side shield (3) and a bottom shell (4). The insulative housing also has a bottom board (17) defining a number of grooves (170) communicating with the passageways. Each terminal includes a soldering portion (26) and a body portion (21) partially exposed to the groove and straddling over the groove.

15 Claims, 8 Drawing Sheets

SHIELDED ELECTRICAL CONNECTOR WITH IMPROVED INSULATIVE HOUSING

CROSS-REFERENCE TO RELATED APPLICATIONS

This patent application is a continuation-in-part of a pending U.S. patent application Ser. No. 11/148,503, now U.S. Pat. No. 7,147,481, filed Jun. 08, 2005, and entitled "SHIELDED ELECTRICAL CONNECTOR WITH ANTI-MISMATING MEANS", which is invented by the same inventor as this patent application and assigned to the same assignee with this application.

BACKGROUND OF THE INVENTION

1. Field of the Invention

The present invention relates to a shielded electrical connector in which an electrical element such as a camera module is fitted.

2. Description of Related Art

With development of cellular mobile phones or the likes, a lot of functions such as taking photos are added to the mobile phones or the likes. In order to achieve the functions, an electrical element such as a camera module is furnished to a mobile phone or the likes in virtue of an electrical connector. Generally, a shield member is assembled to the electrical connector to prevent penetration of electromagnetic radiation.

A conventional electrical connector described in U.S. Pat. No. 6,398,598 comprises an insulator provided with a plurality of grooves and a plurality of terminals retained in the corresponding grooves. The insulator has a bottom wall, in which the grooves thereof are defined. Each terminal comprises a body portion located on an upper surface of the bottom wall, a U-shaped spring portion extending from one end of the body portion, a contact portion capable of being depressed downwardly and a pair of projecting portion projecting laterally from the opposite sides of the body portion. A pair of slots are defined at a lower portion of each groove for engaging with the corresponding pair of projecting portions.

When the contact portion is depressed downwardly under an exerted force, the spring portion is resiliently bent around a point a positioned at a boundary area of the spring portion and the body portion. The force would be transferred from the contact portion toward the point a and concentrated in the contact portion and the spring portion. The terminal is easy to have a distortion or be broken off due to the concentration of the exerted force when the structure is used for certain a long time.

Another conventional shielded electrical connector is described in U.S. Patent Application Publication No. 2004/0023528. The shielded electrical connector comprises a case defining a chamber in which a camera module is fitted, and a plurality of terminals retained in the chamber. One end of the terminal is bent inwardly for contacting with the camera module. The other end of the terminal is bent outwardly horizontally so as to be soldered onto a PCB.

As is described above, the shielded electrical connector is soldered onto the PCB in virtue of the ends of the terminals. However, there is no partitions positioned among the ends of the terminals to separate them from each other. Therefore, the abutting ends are located so closely without any partitions positioned there among that may result in signal interference among the terminals.

Hence, an improved shielded electrical connector is required to overcome the above-mentioned disadvantages of the related art.

SUMMARY OF THE INVENTION

A primary object of the present invention is to provide a shielded electrical connector having an improved insulative housing, wherein a plurality of terminals can be securely retained in the insulative housing.

Another object of the present invention is to provide a shielded electrical connector having an improved shield for avoiding signal interference among a plurality of terminals mounted thereon.

To achieve the aforementioned objects, a shielded electrical connector, to which an electrical element formed is electrically connected, comprising: an insulative housing having a plurality of passageways defined therein, a plurality of terminals correspondingly retained in the passageways, a side shield and a bottom shell. The insulative housing has a bottom board defining a plurality of grooves communicating with the passageways. Each terminal comprises a soldering portion and a body portion partially exposed to the groove.

Other objects, advantages and novel features of the invention will become more apparent from the following detailed description of a preferred embodiment when taken in conjunction with the accompanying drawings.

DETAILED DESCRIPTION OF THE INVENTION

Figure 1:
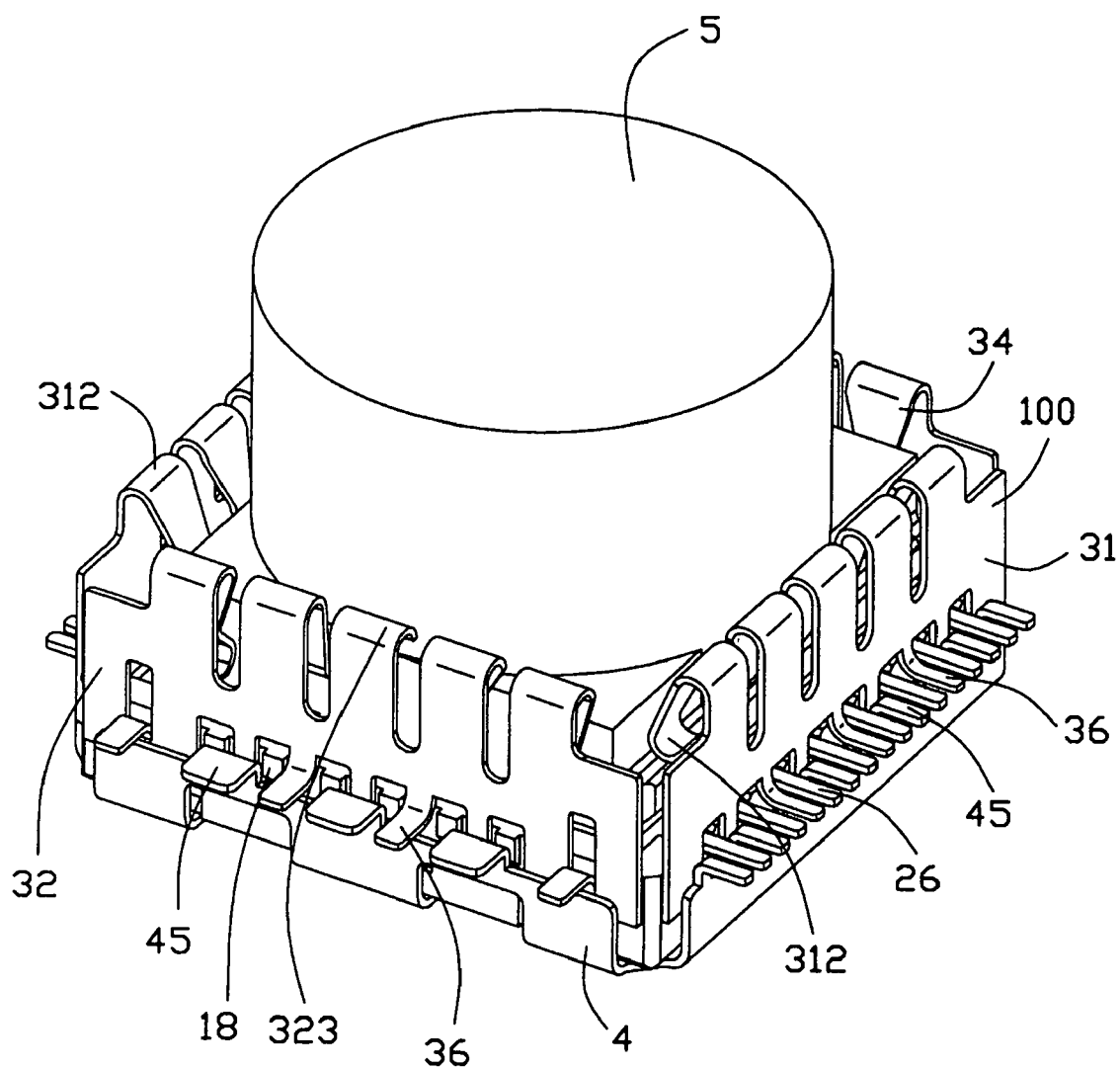
FIG. 1 is an assembled perspective view of a shielded electrical connector in accordance with the present invention with an electrical element received therein.
Figure 2:
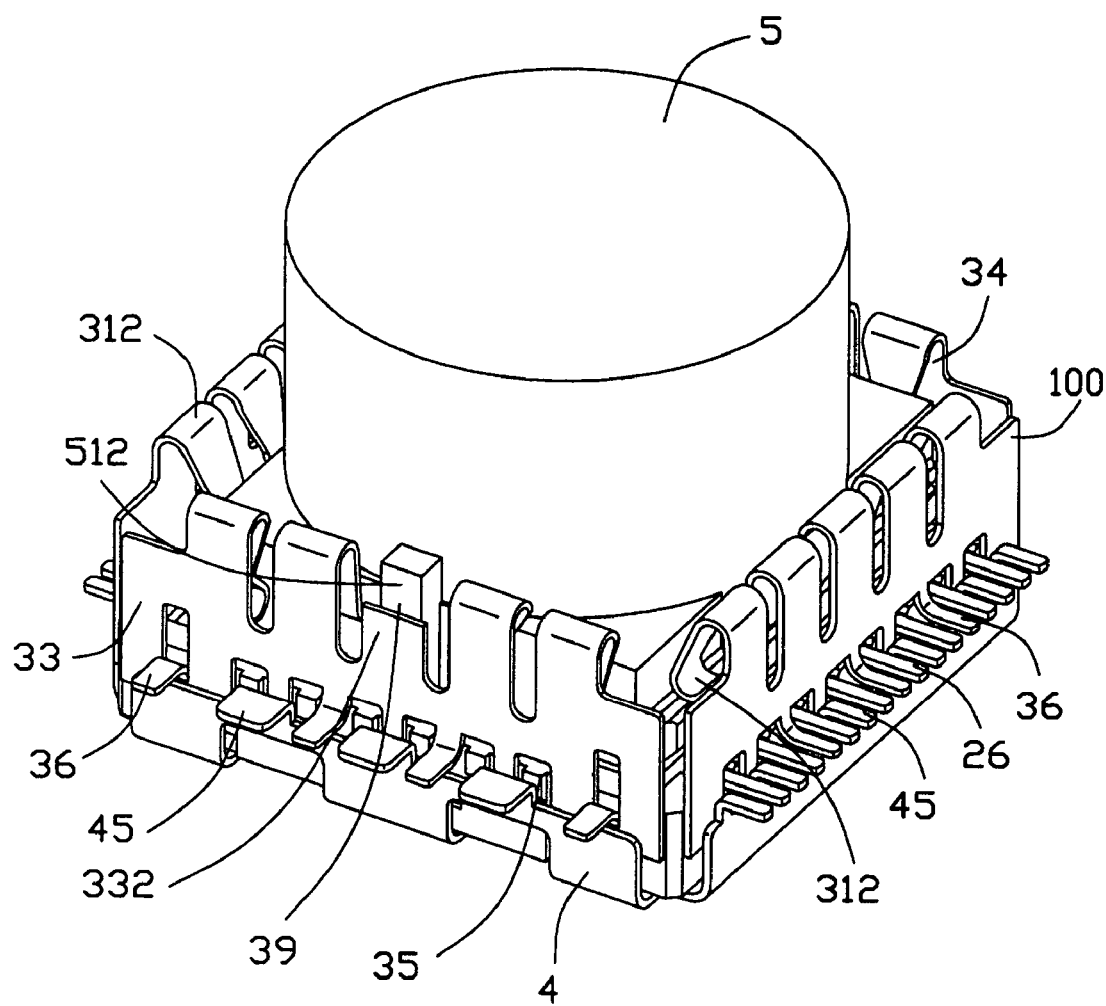
FIG. 2 is another assembled perspective view of FIG. 1.

Reference will now be made to the drawing figures to describe the present invention in detail. Referring to FIG. 1, a shielded electrical connector 100 in accordance with the preferred embodiment of the present invention is adapted for electrically connecting a camera module 5 with a PCB (not shown). In fact, the shielded electrical connector 100 may also be used for other kinds of electrical element in other embodiments.

Figure 4:
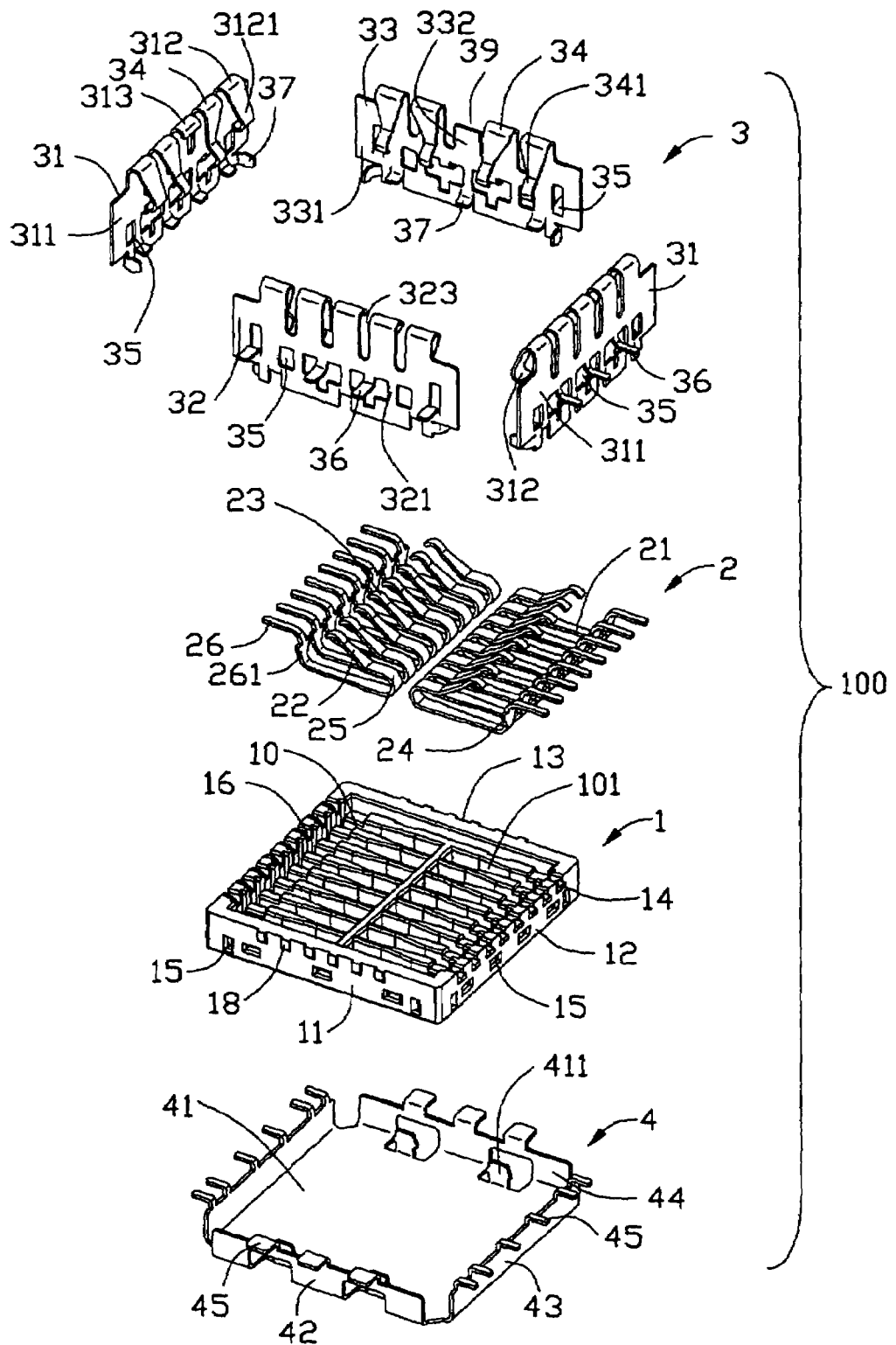
FIG. 4 is an exploded view of the shielded electrical connector as shown in FIG. 1.
Figure 5:
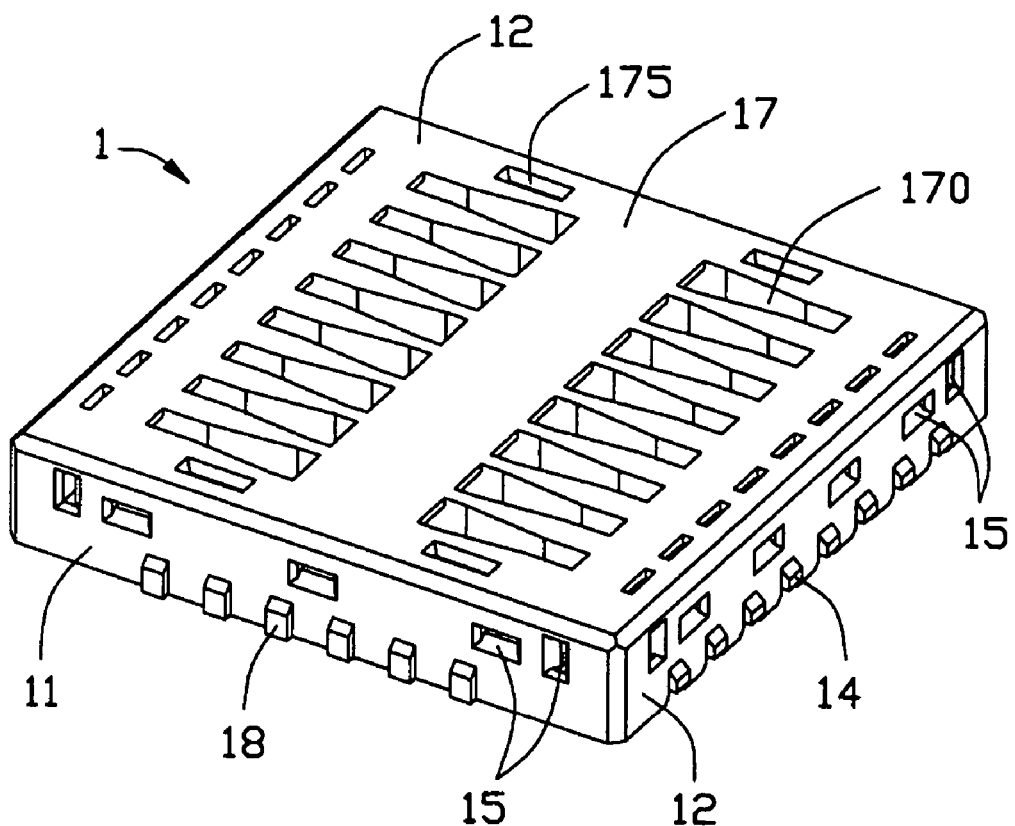
FIG. 5 is a perspective view of an insulative housing.
Figure 6:
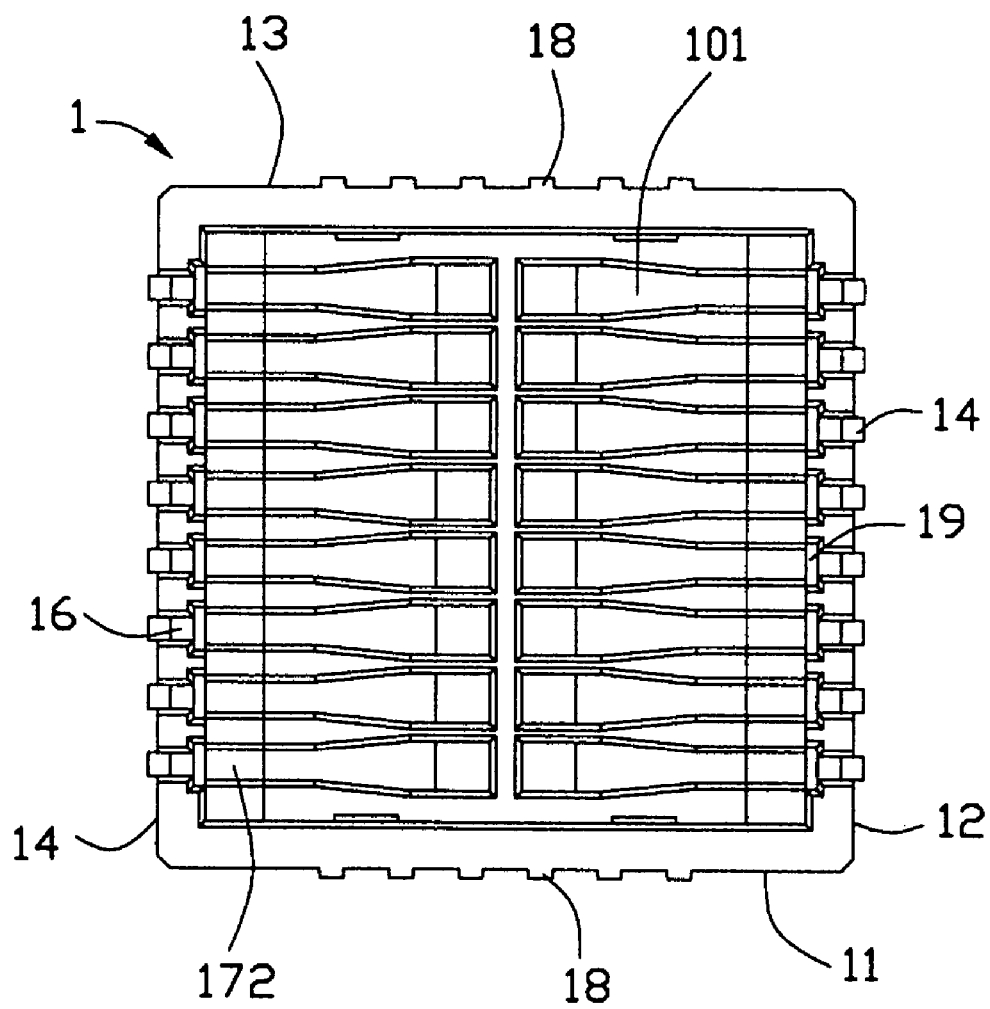
FIG. 6 is a bottom view of the insulative housing as shown in FIG. 5.

Referring to FIG. 4, the shielded electrical connector 100 comprises an insulative housing 1, a plurality of terminals 2 disposed in the insulative housing 1, a side shield 3 mounted around the insultaive housing 1 and a bottom shell 4 attached to a bottom of the insulative housing 1.

Referring to FIGS. 4-8, The insulative housing 1 is a rectangular board, comprising a bottom board 17, a plurality of walls 11, 12, 13 extending upwardly from the bottom board 17 to thereby define a cavity 10 therebetween. The insulative housing 1 defines therein a plurality of passageways 101 symmetrically arranged in two rows in a longitudinal direction above an upper surface of the bottom board 17. The bottom board 17 defines thereon a plurality of grooves 170 communicating with said corresponding passageways 101. Each groove 170 extends throughout the bottom board 17 and has a length smaller than that of the passageway 11. Additionally, each passageway 101 has a pair of first inner walls 102 extending upwardly from a pair of opposite longitudinal ends thereof. Each groove 170 is provided with a pair of second inner walls 171 at a pair of opposite longitudinal ends thereof. The second inner walls 171 have a height lower than that of the first inner walls 102. The bottom board 17 has four recesses 175 defined at a bottom surface thereof.

The walls 11, 12, 13 comprises a front wall 11, a rear wall 13 opposite to the front wall 11 and a pair of opposite periphery walls 12. The periphery walls 12 respectively define a plurality of slots 16 at an upper surface thereof, a plurality of engaging slits 19 at an inner surface thereof, and a plurality of protrusions 14 projecting outwardly therefrom and corresponding to the slots 16. The walls 11, 12, 13 respectively has a plurality of pinholes 15 defined on an outer surface thereof. The front wall 11 and the rear wall 13 respectively has a plurality of tubers 18 formed on the outer surface thereof.

Each terminal 2 comprises a body portion 21, a U-shaped bending portion 25 extending from one end of the body portion 21, a neck portion 22 projecting upwardly and backwardly, an upwardly extending semi-spherical contact portion 23 for electrically connecting the electrical element 5, an L-shaped soldering portion 26 extending from the other end of the body portion 21 in a direction away from the body portion 21 and a pair of barb portions 24. Each soldering portion 26 is provided with a connecting portion 261 connecting with the body portion 21 and the pair of barb portions 24 extending laterally from a central part of the connecting portion 261. The soldering portions 26 are used to be soldered onto the PCB.

The side shield 3 comprises four separate shielding plates 31, 32, 33 mounted around the insulative housing 3. The shielding plates include a primary pate 32, a pair of opposite periphery plates 31 which are located respectively perpendicular to two opposite sides of the primary pate 32, and an end plate 33 positioned adjacent to the pair of periphery plates 31. Each shielding plate 31, 32, 33 is provided with a sheet portion 311, 32, 331, on which a plurality of apertures 35 are defined.

The primary plate 32 has two pairs of first resilient portions 34 and a third resilient portion 323 formed in U-shape with a free end extending inwardly from a top thereof. The third resilient portion 323 is located in the middle of the first resilient portions 34 which are symmetrically arranged. Each first resilient portion 34 has a longer length than that of the third resilient portion 323 with the free end thereof extending inwardly downwardly. A grounding portion 341 projecting inwardly laterally is formed at the free end of the first resilient portion 34.

The periphery plates 31 comprises a pair of second resilient portions 312, a pair of first resilient portions 34 located between the second resilient portions 312 and the third resilient portion 313 positioned in the middle thereof. The second resilient portion 312 extends obliquely and downwardly from an outer position to an inner position with regard to the insulative housing 1 and has a resisting portion 3121 formed at a free end thereof. The second and the third resilient portions 312, 313 are used to resiliently stand against the camera module 5.

The end plate 33 has four first resilient portions 341 formed thereon, a beam 332 positioned in the middle thereof and a cutout 39 is defined at a top of the beam 332. The shielding plates 31, 32, 33 respectively has a plurality of apertures 35, a plurality of soldering feet 36 formed beside the apertures 35 and a plurality of mounting portion 37 extending inwardly from a lower portion thereof.

The bottom shell 4 cooperating with the side shield 3 is attached to a bottom of the insulative housing 1 to substantially encase therein the insulative housing 1. The bottom shell 4 comprises a bottom wall 41, a front wall 42, a real wall 44 opposite to the front wall 42 and a pair of periphery walls 43 extending upwardly from side edges of the bottom wall 41. Further more, the front wall 42, the rear wall 44 and the periphery walls 43 respectively has a plurality of soldering tabs 45 formed thereon. Each soldering tab 45 has a free end extending outwardly and coplanar with the soldering feet 36 of the side shield 1. The bottom wall 41 has two pairs of inserting portions 411 extending upwardly from an inner surface thereof. Two pairs of the inserting portions 411 adapted to be inserted in the recesses 175 are respectively positioned adjacent to the front wall 42 and the rear wall 44.

Figure 3:
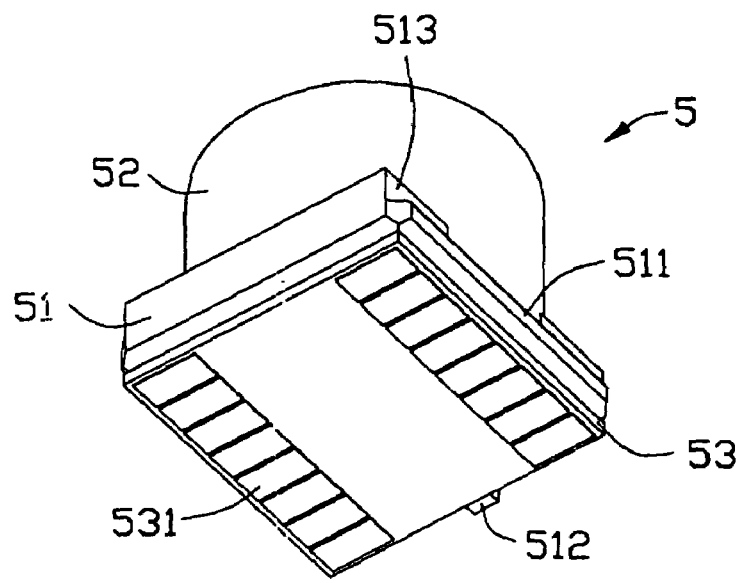
FIG. 3 is a perspective view similar to FIG. 1 with the electrical element removed therefrom.
Figure 3:
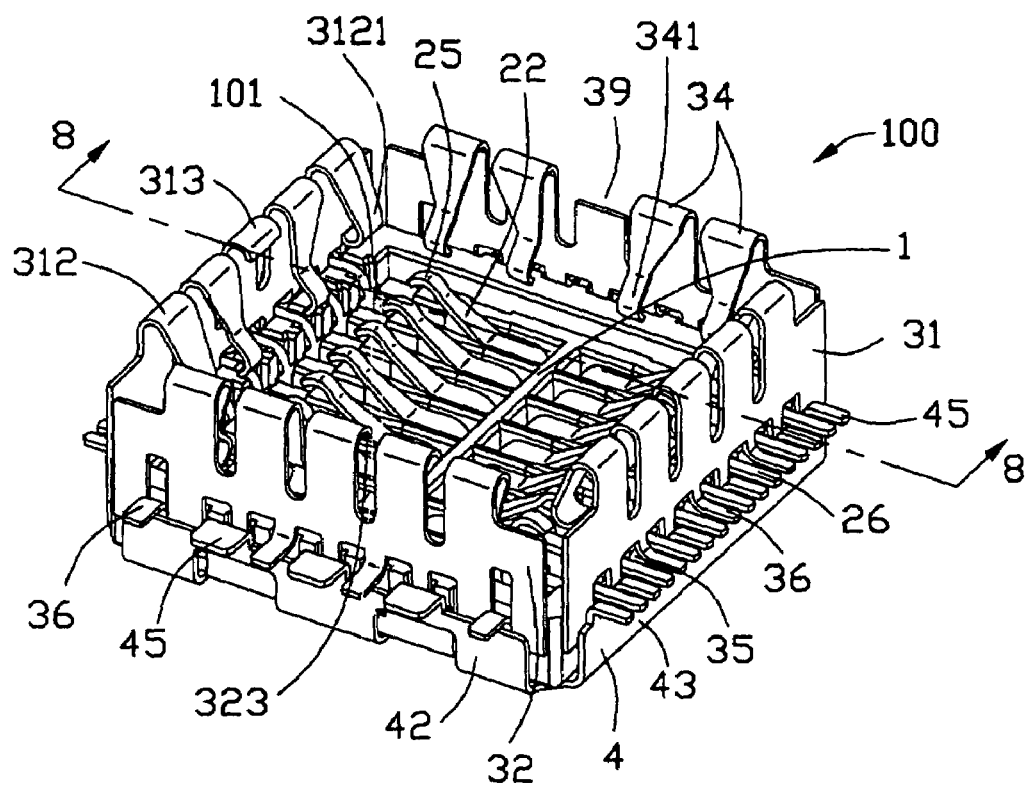

Referring to FIG. 3, the camera module 5 comprises a base portion 51, a columnar portion 52 extending upwardly from the base portion 51, and a bottom portion 53 positioned below the base portion 51. The base portion 51 is a rectangular board and has a pair of flanges 511 laterally extending in directions from a pair of side walls thereof. The base portion 51 additionally has a projecting portion 512 raising upwardly from an upper surface thereof. The bottom portion 53 formed as a substantially flat plate has a plurality of conductive paths 531 provided at a bottom surface thereof.

Referring to FIGS. 1-8, in assembly, the plurality of terminals 2 are assembled to the insulative housing 1 by being correspondingly inserted into the passageways 101. The body portions 21 are securely received in the passageways 101 and partially exploded to the groove 170. A plurality of tails of soldering portions 26 are inserted into the slots 16 and held by the protrusions 14, with the barb portions 24 having an interference with the engaging slits 19.

The side shield 3 are mounted around the insulative housing 1 with the mounting portions 37 thereof inserted into the corresponding pinholes 15. The primary plate 32 and the pair of periphery plates 31 respectively maintains facing to the front wall 11 and the periphery walls 12. The tubers 18 are correspondingly received in the apertures 35. The tails of soldering portions 26 extend to the outside of the side shield 3 laterally through the apertures 35. The soldering portions 26 and the soldering feet 36 are located on a same plane.

The bottom shell 4 is then attached to the bottom of the insulative housing 3 in a bottom-to-top direction, with the inserting portions 411 thereof inserted into the corresponding recesses 175 and the walls 42, 43, 44 thereof surrounding the walls 11, 12, 13 to thereby secure and enclose therein the insulative housing 1 together with the terminals 2. The soldering tabs 45, soldering feet 36 and the tails of soldering portions 26 are coplanar with each other and are used to be soldered on to the PCB together. Additionally, the soldering portions 26 are separated from each other by the soldering feet 36 and the soldering tabs 45 to thereby avoid signal interference among the terminals 2.

When the camera module 5 is guided into the cavity 10, the shielded plates 31, 32, 33 are pressed and deflected outwardly. The projecting portion 512 engages with the cutout 39. When the camera module 5 is completely inserted in, the third resilient portions 313 have an interference with the columnar portion 52 and the grounding portions 341 electrically contact with the bottom portion 53 for grounding. The base portion 51 is resisted against by the resisting portions 3121. The camera module 5 is thus firmly fastened to the structure. At the same time, the contact portions 23 of the terminals 2 are resiliently depressed and contact with the conductive paths 531.

Figure 7:
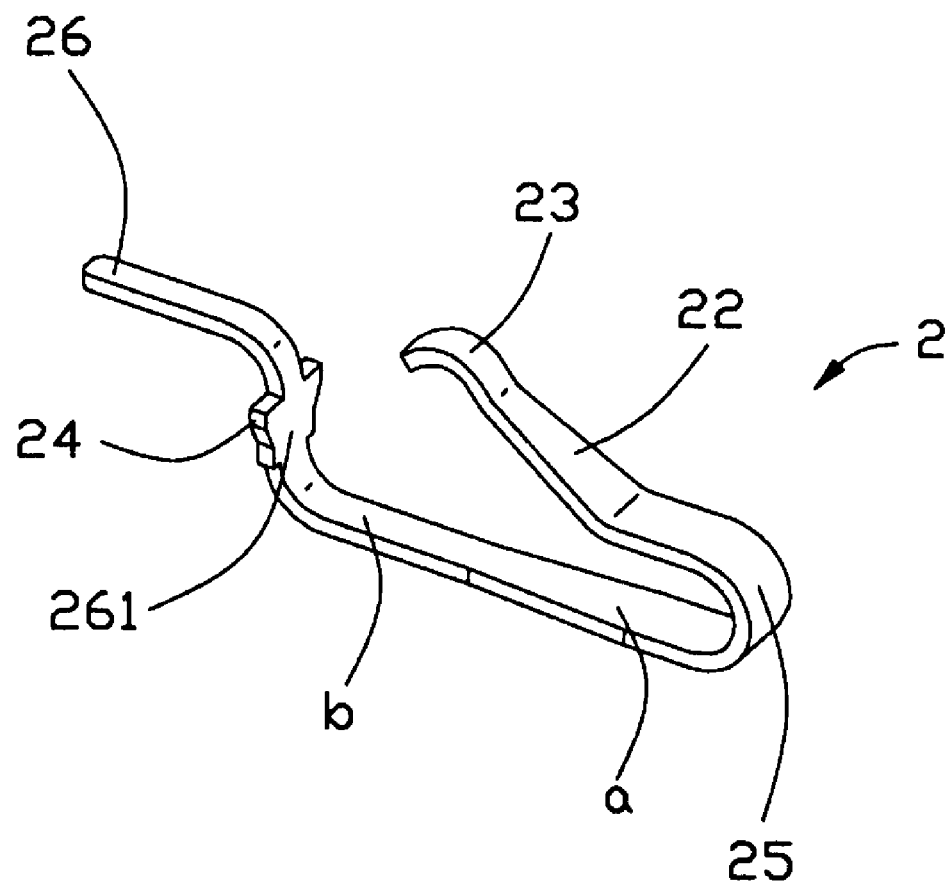
FIG. 7 is perspectively view of a terminal as shown in FIG. 4.
Figure 8:
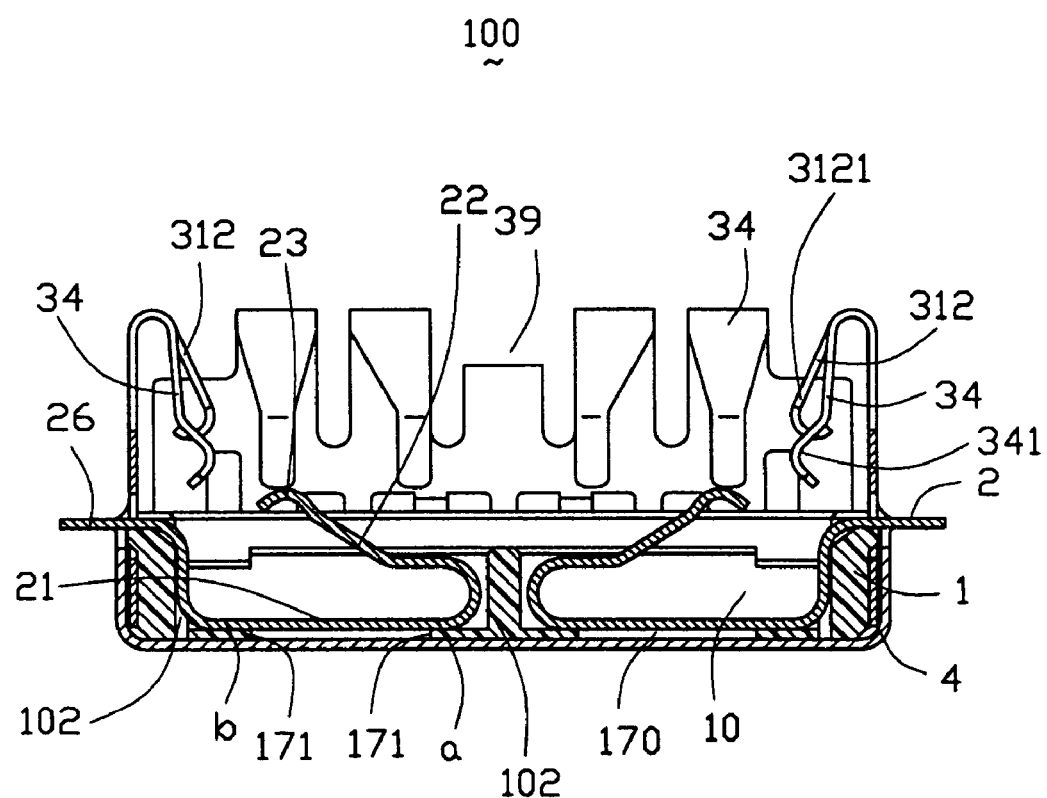
FIG. 8 is a cross-sectional view of the electrical connector as shown in FIG. 3 taken along line 8-8.

To compare with the conventional invention, one merit of this invention is defining a plurality of grooves 170 communicating with the passageways 101. The body portions 21 of the terminals 2 received in the passageways 101 are partially exposed to the grooves 170. Referring to FIGS. 7 and 8, defining a point b on the body portion 21. The point b of the body portion 21 is defined adjacent to the connecting portion 261 and is positioned above a top of second inner wall 171. Once suffering an depressing force during assembly, the terminal in related art would resiliently bent around the point a but the terminal 2 in accordance with the present invention would be resiliently bent around the point b. In the present invention, the force is transferred through a path from the contact portion 23 toward the body portion 21 but not toward the bending portion. Thus the force is dispersed through the path longer than that of the related art. The mechanical performance of the present terminals 2 would be improved finally.

Another merit of this invention is providing a plurality of soldering feet 36 and soldering tabs 45 on the side shield 3 and the bottom shell 4 for being soldered onto the PCB. The soldering portions 26 are separated from each other by the soldering feet 36 and the soldering tabs 45 to thereby avoid signal interference among the terminals 2.

However, the disclosure is illustrative only, changes may be made in detail, especially in matter of shape, size, and arrangement of parts within the principles of the invention.

What is claimed is:

1. A shielded electrical connector, to which an electrical element is electrically connected, comprising:
    an insulative housing defining a plurality of passageways and a bottom board, said bottom board defining a plurality of grooves communicating with said passageways respectively, each groove having a length smaller than that of the passageway;
    a plurality of terminals retained in corresponding passageways, each terminal having a body portion located on said bottom board and straddling over the groove along an extending direction of the body portion for partially exposing the body portion to said groove;
    a side shield mounted around the insulative housing; and
    a bottom shell attached to a bottom of said insulative housing, said bottom shell cooperating with said side shield to substantially encase therein said insulative housing together with said terminals.

2. The shielded electrical connector as claimed in claim 1, wherein each terminal comprises a contact portion extending upwardly for electrically connecting said electrical element, a soldering portion extending from one end of the body portion, and barb portions extending laterally from said soldering portion.

3. The shielded electrical connector as claimed in claim 2, wherein said insultaive housing defines a plurality of engaging slits at an inner surface of a pair of periphery walls thereof for engaging with said barb portions.

4. The shielded electrical connector as claimed in claim 2, wherein said insultaive housing defines a plurality of slots at an upper surface thereof for extending of tails of said soldering portions.

5. The shielded electrical connector as claimed in claim 4, wherein said side shield has a plurality of apertures defined thereon and said tails of said soldering portions extend outwardly through corresponding apertures.

6. The shielded electrical connector as claimed in claim 5, wherein said side shield has a plurality of soldering feet formed beside said apertures.

7. The shielded electrical connector as claimed in claim 6, wherein said soldering feet are positioned among said soldering portions.

8. The shielded electrical connector as claimed in claim 7, wherein said bottom shell is provided with a plurality of soldering tabs staggeredly arranged with said tails of said soldering portions and the soldering feet.

9. The shielded electrical connector as claimed in claim 8, wherein the tails of the soldering portions, the soldering feet and the soldering tabs are coplanar with each other.

10. The shielded electrical connector as claimed in claim 2, wherein each terminal comprises a U-shaped bending portion and an upwardly projecting neck portion.

11. The shielded electrical connector as claimed in claim 1, wherein said side shield comprises a plurality of shielding plates mounted around said insulative housing, and said shielding plates have a plurality of first resilient portions for grounding, a plurality of second and third resilient portions for standing against said electrical element.

12. The shielded electrical connector as claimed in claim 1, wherein said side shield is provided with a plurality of mounting portions and said insulative housing defines thereon a plurality of pinholes for insertion of said mounting portions.

13. The shielded electrical connector as claimed in claim 1, wherein said bottom shell has a plurality of inserting portions extending upwardly and said insulative housing has a plurality of recesses defined at a bottom surface thereof for insertion of corresponding inserting portions.

14. The shielded electrical connector as claimed in claim 1, wherein said bottom wall comprises a plurality of pairs of inner walls, each pair of inner walls being formed at opposite longitudinal ends of each groove for supporting corresponding body portion of each terminal.

15. A shielded electrical connector, to which an electrical element is electrically connected, comprising:
    an insulative housing defining a plurality of passageways and a plurality of side walls, some of said side walls defines slots in a top surface in alignment with the corresponding passageways, respectively;
    a plurality of terminals retained in corresponding passageways, each terminal having a body portion received in the corresponding passageways, and a solder tail extending outward and received in the corresponding slot for being separated from another solder tail of the adjacent terminal;
    and a side shield mounted around the side walls of the insulative housing, said shield comprising openings to allow the solder tails to extend outwardly.

* * * * *